United States Patent
Tanaka et al.

(10) Patent No.: US 9,879,130 B2
(45) Date of Patent: Jan. 30, 2018

(54) ADDITIVE FOR RUBBER, AND RUBBER COMPOSITION OBTAINED BY BLENDING SAME

(71) Applicant: Dow Corning Toray Co., Ltd., Tokyo (JP)

(72) Inventors: Teruyoshi Tanaka, Gotemba (JP); Toyohisa Toyama, Offenbach am Main (DE)

(73) Assignee: DOW CORNING TORAY CO. LTD., Chiyoda-Ku, Tokyo (JP)

(*) Notice: Subject to any disclaimer, the term of this patent is extended or adjusted under 35 U.S.C. 154(b) by 0 days.

(21) Appl. No.: 14/399,241

(22) PCT Filed: Apr. 30, 2013

(86) PCT No.: PCT/JP2013/062602
§ 371 (c)(1),
(2) Date: Feb. 5, 2015

(87) PCT Pub. No.: WO2013/168635
PCT Pub. Date: Nov. 14, 2013

(65) Prior Publication Data
US 2015/0183969 A1   Jul. 2, 2015

(30) Foreign Application Priority Data
May 7, 2012   (JP) .................. 2012-105923

(51) Int. Cl.
| | |
|---|---|
| *C08L 7/00* | (2006.01) |
| *C08L 21/00* | (2006.01) |
| *F16F 15/08* | (2006.01) |
| *C08L 53/02* | (2006.01) |
| *C08L 91/00* | (2006.01) |
| *C08L 9/06* | (2006.01) |
| *C08L 23/02* | (2006.01) |
| *C08K 5/01* | (2006.01) |

(52) U.S. Cl.
CPC ...... *C08L 7/00* (2013.01); *C08L 9/06* (2013.01); *C08L 21/00* (2013.01); *C08L 23/02* (2013.01); *C08L 53/025* (2013.01); *C08L 91/00* (2013.01); *F16F 15/08* (2013.01); *C08K 5/01* (2013.01)

(58) Field of Classification Search
CPC .................................. C08L 7/00; C08L 53/025
USPC ........................................................ 524/526
See application file for complete search history.

(56) References Cited

U.S. PATENT DOCUMENTS

| | | | |
|---|---|---|---|
| 3,265,765 A | 8/1966 | Holden et al. | |
| 5,540,983 A * | 7/1996 | Maris ................... | C08L 51/006 198/957 |
| 7,193,004 B2 | 3/2007 | Weydert et al. | |
| 7,671,132 B1 * | 3/2010 | Thielen ................ | B60C 1/0016 524/451 |
| 8,602,075 B2 | 12/2013 | Albert et al. | |
| 2006/0211586 A1 * | 9/2006 | Huang ................ | C10M 143/00 508/591 |
| 2010/0036038 A1 | 2/2010 | Rodgers et al. | |
| 2010/0263778 A1 | 10/2010 | Lesage et al. | |

FOREIGN PATENT DOCUMENTS

| | | | |
|---|---|---|---|
| CN | 101294056 A | 10/2008 | |
| CN | 101480903 A | 7/2009 | |
| CN | 101508838 A | 8/2009 | |
| CN | 101747564 A | 6/2010 | |
| EP | 1 277 822 A1 | 1/2003 | |
| EP | 1277822 A1 * | 1/2003 | |
| EP | 2 431 417 A1 | 3/2012 | |
| EP | 2431417 A1 * | 3/2012 | .......... C08L 23/0815 |
| JP | S4023798 | 10/1965 | |
| JP | H 07-258512 A | 10/1995 | |
| JP | H 11-080434 A | 3/1999 | |
| JP | 2002-317097 A | 10/2002 | |
| JP | 2005-023296 A | 1/2005 | |
| JP | 2008-031211 A | 2/2008 | |
| JP | 2010-047682 A | 3/2010 | |
| JP | 2010-513121 A | 4/2010 | |
| JP | 2010-532801 A | 10/2010 | |
| JP | 2011-190397 A | 9/2011 | |
| JP | 2011190397 A * | 9/2011 | |
| WO | WO 8800603 A2 * | 1/1988 | .............. C08L 53/02 |
| WO | WO 2011/000797 A1 | 1/2011 | |

OTHER PUBLICATIONS

English language abstract and machine-assisted English translation for CN 101294056 extracted from espacenet.com database on Nov. 18, 2015, 26 pages.
English language abstract and machine-assisted English translation for CN 101480903 extracted from espacenet.com database on Nov. 18, 2015, 14 pages.
English language abstract and machine-assisted English translation for CN 101508838 extracted from espacenet.com database on Nov. 18, 2015, 18 pages.
English language abstract and machine-assisted English translation for CN 101747564 extracted from espacenet.com database on Nov. 18, 2015, 11 pages.
English language abstract and machine-assisted English translation for JP 2011-190397 extracted from espacenet.com database on Jan. 27, 2016, 22 pages.

(Continued)

*Primary Examiner* — Michael M Bernshteyn
(74) *Attorney, Agent, or Firm* — Howard & Howard Attorneys PLLC

(57) ABSTRACT

The present invention pertains to: an additive for rubber, comprising (A) a hydrocarbon-based oil and (B) a styrene/diene block copolymer; and a rubber composition obtained by blending the additive for rubber into rubber. The present invention makes it possible to provide an additive for rubber which has little impact on the environment or the human body and enables the provision of rubber having excellent heat resistance and spring properties, as well as a rubber composition obtained by blending the same.

8 Claims, No Drawings

(56) References Cited

OTHER PUBLICATIONS

International Search Report for Application No. PCT/JP2013/062602 dated Jul. 16, 2013, 5 pages.
English language abstract not found for JPH 07-258512; however, see English language equivalent U.S. Pat. No. 5,540,983. Original document extracted from espacenet.com on Nov. 19, 2014, 6 pages.
English language abstract and machine-assisted English translation for JPH 11-080434 extracted from the PAJ database on Nov. 19, 2014, 18 pages.
English language abstract and machine-assisted English translation for JP 2002-317097 extracted from the PAJ database on Nov. 20, 2014, 22 pages.
English language abstract for JP 2005-023296 extracted from espacenet.com database on Nov. 19, 2014, 1 page.
English language abstract and machine-assisted English translation for JP 2008-031211 extracted from the PAJ database on Nov. 20, 2014, 24 pages.
English language abstract and machine-assisted English translation for JP 2010-047682 extracted from the PAJ database on Nov. 19, 2014, 32 pages.
English language abstract for JP 2010-513121 extracted from espacenet.com database on Nov. 19, 2014, 2 pages.
Machine-assisted English language abstract for JP 2010-532801 extracted from espacenet.com database on Nov. 19, 2014, 2 pages.
English language abstract not found for JPS4023798; however, see English language equivalent U.S. Pat. No. 3,265,765. Original document extracted from espacenet.com on Jan. 29, 2015, 7 pages.
English language abstract and machine-assisted English translation for WO 2011/000797 extracted from espacenet.com database on Jun. 27, 2016, 25 pages.

\* cited by examiner

ADDITIVE FOR RUBBER, AND RUBBER COMPOSITION OBTAINED BY BLENDING SAME

TECHNICAL FIELD

Related Applications

The present patent application is the National Stage of International Patent Application No. PCT/JP2013/062602, filed on Apr. 30, 2013, which claims priority to and all the advantages of Japanese Patent Application No. 2012-105923, filed on May 7, 2012, the content of which is incorporated herein by reference.

The present invention relates to an additive for rubber and a rubber composition. More specifically, the present invention relates to an additive for rubber that has little impact on the environment and the human body and that can provide excellent heat resistance and spring properties and to a rubber composition prepared by blending the additive for rubber.

BACKGROUND ART

Rubber process oil is one of the additives for rubber used in rubber manufacture. The rubber process oil is an oil used to improve the plasticity of a rubber or lower the hardness of a vulcanized rubber to improve the processability. It is used properly according to the raw materials of the rubber and the product applications. Ordinarily, aroma-based, naphthene-based, or paraffin-based rubber process oils are used. Since the rubber process oil is required to have compatibility with rubber related to the rubber properties, aroma-based rubber process oils have been usually used for natural rubbers or diene-based synthetic rubbers.

However, since aroma-based rubber process oils usually contain polycyclic aromatics (PCA), the carcinogenic impact on the human body becomes a problem. Handling of mineral oils containing 3 mass % or more of PCA is limited in Europe.

From this background, technologies regarding non-carcinogenic rubber process oil with reduced PCA and good compatibility with rubber have been studied. Technologies relating to naphthene-based rubber process oil (for example, patent documents 1 and 2) and paraffin-based rubber process oil (for example, patent document 3) are disclosed.

However, although the naphthene-based and paraffin-based rubber process oils can reduce the impact on the human body and the environment, they more easily evaporate from the rubber compositions compared to the aroma-based rubber process oil. As a result, the rubber hardness varies as the temperature changes, and heat resistance becomes a problem.

PRIOR ART DOCUMENTS

Patent Document 1: Japanese Unexamined Patent Application Publication No. 2010-47682
Patent Document 2: Japanese Unexamined Patent Application Publication No. H11-80434
Patent Document 3: Japanese Unexamined Patent Application Publication No. 2008-31211

SUMMARY OF THE INVENTION

Problem to be Solved by the Invention

In light of the above, an object of the present invention is to provide an additive for rubber that is capable of providing rubber that is not subject to environmental regulations and has excellent heat resistance and spring properties, and to provide a rubber composition obtained by blending the additive for rubber.

Means for Solving the Problem

In order to realize the aforementioned objective, the present inventors conducted extensive research. As a result of this research, it was found that an additive for rubber including (A) a hydrocarbon-based oil instead of a conventional rubber process oil and (B) a styrene-diene block copolymer could satisfy the aforementioned objective, and the present invention was thereby achieved. That is, the present invention provides an additive for rubber that includes (A) a hydrocarbon-based oil and (B) a styrene-diene block copolymer, and the rubber composition is obtained by blending the additive for rubber into (C) a rubber.

The additive for rubber preferably includes component (A) in an amount of 60 to 99 mass % and component (B) in an amount of 1 to 40 mass % with respect to the total mass of the additive for rubber.

The component (A) is preferably an olefin oil, and more preferably a poly-α-olefin oil.

The component (A) may use the poly-α-olefin oil alone or in combination with an olefin copolymer.

The component (B) is preferably a styrene-hydrogenated diene block copolymer, and more preferably a styrene-hydrogenated polyisoprene.

The component (B) may use styrene-hydrogenated polyisoprene alone or in combination with styrene-hydrogenated poly(isoprene/butadiene).

Preferably, all or part of the component (B) has a diblock structure.

Preferably, the component (C) is a natural rubber or a diene-based synthetic rubber or a combination of both.

Preferably, the additive for rubber is blended in an amount of 0.1 to 20 parts by mass with respect to 100 parts by mass of the component (C).

Preferably, the rubber composition further includes (D) a reinforcing agent, and the component (D) is preferably carbon black.

The rubber composition may be used for vibration damping, and a rubber part for vibration damping may be manufactured by crosslinking and molding the rubber composition.

Effect of the Invention

The additive for rubber of the present invention is prepared by blending a hydrocarbon-based oil and a styrene-diene block copolymer. It can provide a rubber composition that has little impact on the environment and the human body and that has excellent heat resistance and spring properties. Also, the rubber composition of the present invention is prepared by blending the additive for rubber, and it has excellent heat resistance and spring properties. Further, this rubber composition may be used appropriately for vibration damping. More specifically, this rubber composition may be used appropriately as a vibration damping material for an engine mount, a stabilizer bushing, a suspension bushing, and the like used in automobiles or other vehicles.

DETAILED DESCRIPTION OF THE INVENTION

In the following, an embodiment of the present invention will be described in detail.

First, the additive for rubber of the present invention will be described.

The additive for rubber of the present invention includes (A) a hydrocarbon-based oil and (B) a styrene-diene block copolymer. The content of component (A) is in a range of 60 to 99 wt %, and the content of component (B) is in the range of 1 to 40 wt % with respect to the total mass of the additive for rubber. More preferably, the content of component (A) is in the range of 80 to 99 wt %, and the content of component (B) is in the range of 1 to 20 mass %. When components (A) and (B) are in the aforementioned ranges, the evaporation loss of the additive for rubber can be reduced, and the rubber hardness will not change because of the temperature, and thus, excellent heat resistance can be realized.

It is possible to use mineral oil or synthetic oil as component (A) as long as it is a hydrocarbon-based oil, and these oils may be used either alone or as a mixture of two or more kinds. It is preferred to use an olefin oil as component (A), and it is more preferred to use a poly-α-olefin oil. Use of the poly-α-olefin oil alone or in combination with an olefin copolymer is preferred.

The dynamic viscosity of component (A) is preferably in a range of 0.1 to 10,000 $mm^2/s$, more preferably in a range of 5 to 2,000 $mm^2/s$, and most preferably in a range of 5 to 500 $mm^2/s$ at 40° C.

Preferred examples of poly-α-olefin oil include hydrogenated homopolymers and copolymers using one or more monomers selected from the group of 1-hexene, 1-octene, 1-decene, 1-dodecene, and 1-tetradecene as raw materials. Among these examples, it is preferred to use 1-decene hydrogenated homopolymer and 1-dodecene/1-decene hydrogenated copolymer. Preferred examples of the olefin copolymer include ethylene-α olefin copolymer and propylene-α olefin copolymer. When poly-α-olefin oil and olefin copolymer are used together, the mass ratio between them can be any mass ratio, but it is usually preferred to be in a range of 50:50 to 99:1.

The styrene-diene block copolymer of component (B) is suitably a block copolymer including a hard block A including styrene-based monomer units and a soft block B including conjugated diene-based monomer units, and/or the product obtained by hydrogenating this copolymer. Also, the soft block B is suitably a soft block mainly including butadiene units and/or isoprene units and/or a soft block obtained by hydrogenating the soft block. The bonding form of each block may be straight-chain form, branched form, radiation form, or a combination of two or more the forms. However, the straight-chain form is preferred. Examples include diblock copolymers of A-B, triblock copolymers of A-B-A, tetrablock copolymers of A-B-A-B, and pentablock copolymers of A-B-A-B-A. Among these examples, diblock copolymers of A-B or triblock copolymers of A-B-A are preferred in consideration of manufacturing ease. In particular, it is more preferred that all or part of the component (B) have a diblock structure. Needless to say, there is no limitation on the bonding form, block number, monomer type, and the like.

The content of the hard block A is in a range of 5 to 60 mass %, and is preferably in a range of 20 to 50 mass % with respect to the total mass of the styrene-diene block copolymer. The content of the soft block B is in a range of 40 to 95 mass %, and is preferably in a range of 50 to 80 mass % with respect to the total mass of the styrene-diene block copolymer.

From the point of view of heat resistance, the hard block A mainly including styrene-based monomer units is a block including a homopolymer or a copolymer including, preferably 50 wt % or more, and more preferably 70 mass % or more of styrene-based monomer units with respect to the total mass of the hard block A, and any other components (for example, conjugated diene-based monomer units). From the point of view of rubber elasticity, the soft block B mainly including conjugated diene-based monomer units is a block including preferably 50 mass % or more, and more preferably, 70 mass % or more of conjugated diene-based monomer units with respect to the total mass of the soft block B, and any other components (for example, styrene-based monomer units).

The entire styrene-diene block copolymer contains preferably 5 to 60 mass %, and more preferably 20 to 50 mass % of styrene-based monomer units and contains preferably 40 to 95 mass % and more preferably 50 to 80 mass % of conjugated diene-based monomer units with respect to the total mass of the styrene-diene block copolymer.

Also, for the hard block A mainly including styrene-based monomer units and the soft block B mainly including conjugated diene-based monomer units, the distribution of the conjugated diene-based monomers or styrene-based monomers in the molecular chain may be random, tapered (the monomer components increase or decrease along the molecular chain), partial block-shaped, or any combination thereof. If each of the hard block A mainly including styrene-based monomer units and the soft block B mainly including conjugated diene-based monomer units has two or more blocks, each block may have the same or different structures.

Examples of the styrene-based monomer used as a raw material for manufacturing the styrene-diene block copolymer include styrene, α-methylstyrene, o-methylstyrene, m-methylstyrene, p-methylstyrene, p-t-butylstyrene, 2,4-dimethylstyrene, 2,4,6-trimethylstyrene, monofluorostyrene, monochlorostyrene, and dichlorostyrene. One or several types of these monomers are selected and used, and of these, use of styrene is preferred.

Examples of the conjugated diene-based monomer used as another raw material for manufacturing the styrene-diene block copolymer include 1,3-butadiene, isoprene, 1,3-pentadiene, 2,3-dimethyl-1,3-butadiene, and 1,3-hexadiene, and the like. One or two or more types of these monomers are selected and used, and of these, use of 1,3-butadiene, isoprene, and combinations thereof is preferred. For the soft block B mainly including conjugated diene-based monomer units, the micro structure thereof may be appropriately selected. For example, when the soft block B includes 1,3-butadiene and isoprene, in the butadiene block, a 1,2-micro structure (representing a structural unit generated as a result of additional polymerization between positions 1 and 2) is preferred to be in a range of 20 to 50 mol %, and particularly in a range of 25 to 45 mol %. For the isoprene block, it is preferred that 70 to 100 mol % of the isoprene have a 1,4-micro structure (representing a structural unit generated as a result of additional polymerization between 1st position and 4th position).

For the styrene-diene block copolymer, it is preferred that all or part of the carbon-carbon double bonds based on the conjugated diene-based monomer be hydrogenated in consideration of the heat resistance and weatherability of the obtained elastomer. Preferably 85 mol % or more, and more preferably 90 mol % or more of the carbon-carbon double bonds are hydrogenated.

The number average molecular weight of the styrene-diene block copolymer is not particularly limited, but is preferably 100000 or higher, and more preferably 150000 or higher. The number average molecular weight mentioned in the present invention is the molecular weight of polystyrene equivalent derived through gel permeation chromatography (GPC) measurements. If the number average molecular weight is less than 100000, the heat resistance represented by the permanent compression strain with processing at 70° C. of the molding product of the obtained thermoplastic elastomer composition (simply referred to as molding product hereinafter) becomes insufficient. On the other hand, if the number average molecular weight exceeds 500000, the moldability of the obtained thermoplastic elastomer composition becomes poor, and the surface gloss of the molding product thereof becomes excessively low, which is not preferable. Note that the number average molecular weight is preferably in a range of 150000 to 370000.

Many styrene-diene block copolymer manufacturing methods have been proposed. According to a typical method described in Japanese Examined Patent Application Publication No. S40-23798, a lithium catalyst or Ziegler catalyst is used to block polymerize a monomer used as the manufacturing raw material in an inactive medium. The hydrogenation method is also well known. The hydrogenated block copolymer is also commercially available.

The additive for rubber of the present invention can be manufactured by homogeneously blending components (A) and (B) using a conventional method. If the component (B) is a solid at 25° C., it is possible to blend components (A) and (B) under heating at a temperature in a range of 50 to 200° C.

If necessary, it is also possible to add various kinds of additives for lubricants within the aforementioned combination ratio range. Examples of the additives for lubricants include antioxidants, surfactants, corrosion inhibitors, dispersants, optical stabilizers, viscosity index improving agents, flow point decrease agents, corrosion inhibitors, metal deactivators, oily agents, extreme-pressure agents, and abrasion preventing agents. Examples of the preferred antioxidants include phosphite-based antioxidants, phenol-based antioxidants, and amine-based antioxidants.

In the following, the rubber composition of the present invention will be described. The rubber composition of the present invention mainly includes (C) a rubber and is obtained by blending an additive for rubber prepared by mixing (A) and (B). The additive for rubber prepared by mixing (A) and (B) is added and blended in an amount of 0.1 to 20 parts by mass per 100 parts by mass of the component (C).

Examples of the component (C) include natural rubber (NR), isoprene rubber (IR), butadiene rubber (BR), styrene-butadiene rubber (SBR), acrylonitrile-butadiene rubber (NBR), and ethylene-propylene-diene-based rubber (EPDM). Of these, it is preferred to use natural rubber, butadiene rubber, or styrene-butadiene rubber in consideration of strength and low dynamic magnification. These rubbers may be used either alone or as a mixture of two or more kinds.

Since a reinforcing agent (D) is usually blended into the rubber composition, the rubber composition may also contain one or several types of components (D) within the aforementioned combination ratio range. It is preferred to use calcium carbonate, silica, or carbon black as the component (D), and of these, carbon black is particularly preferred.

In addition to the aforementioned components, it is also possible to add vulcanizing agents, antioxidants, processing assistants, vulcanization promoters, vulcanization assistants, white fillers, reactive monomers, foaming agents, and the like as needed in appropriate amounts into the rubber composition of the present invention.

The rubber composition of the present invention can be prepared by kneading the components (A) to (C) as the essential materials as well as the component (D) and other components listed above used as needed with a kneader, banbury mixer, open roll, twin screw stirrer, or other kneading machine. This rubber composition is crosslinked by being heated and is used for vibration damping.

The rubber composition of the present invention can be used suitably as a vibration damping rubber composition. More specifically, this rubber composition may be used appropriately as a vibration damping material for an engine mount, a stabilizer bushing, a suspension bushing, and the like used in automobiles or other vehicles.

EXAMPLES

In the following, examples of the additive for rubber and the rubber composition according to the present invention will be described, but the present invention is not limited to these examples. In the examples, the term "parts" means part by mass.

First, the materials listed below were prepared prior to the examples and comparative examples.
[Naphthene-Based Oil]
Diana Process NM280 (3.978 cSt at 98.9° C., produced by Idemitsu Kosan Co., Ltd.)
(Paraffin-Based Oil)
Diana Process PW380 (30.10 cSt at 40° C., produced by Idemitsu Kosan Co., Ltd.)
(Aroma-Based Oil)
Fukkol AROMAX #3 (24.46 cSt at 40° C., produced by Fuji Kosan Co., Ltd.)
(Poly-α-Olefin Oil)
DURASYN 164 (16.8 cSt at 40° C., produced by INEOS Corp.)
(Olefin Copolymer)
Lucant HC-600 (9850 cSt at 40° C., produced by Mitsui Chemicals, Inc.)
(Polymer (1))
SEPTON 1020 (diblock, polystyrene-hydrogenated polyisoprene block copolymer, produced by Kuraray Co., Ltd.)
(Polymer (2))
HYBRAR KL7350 (diblock, polystyrene-hydrogenated poly(isoprene/butadiene) block copolymer, produced by Kuraray Co., Ltd.)
(Polymer (3))
SEPTON KL-J3341 (triblock, polystyrene-hydrogenated poly(isoprene/butadiene) block copolymer, produced by Kuraray Co., Ltd.)
(Polymer (4))
SEPTON 2104 (triblock, polystyrene-hydrogenated polyisoprene block copolymer, produced by Kuraray Co., Ltd.)
(Polymer (5))
SEPTON 4033 (triblock, polystyrene-hydrogenated poly(isoprene/butadiene) block copolymer, produced by Kuraray Co., Ltd.)
(NR)
Natural rubber RSS #3
(Zinc Oxide)
Two types of zinc oxide (produced by Sakai Chemical Industry Co., Ltd.)
(Stearic Acid)
Lunac S30 (produced by Kao Corporation)
(Ozone Antioxidant)
Ozonon 6C (produced by Seiko Chemical K.K.)

(Amine Antioxidant)
Antigen RD-G (produced by Sumitomo Chemical Co., Ltd.)
(Wax)
Sanokku (produced by Ouchi Shinko Chemical Co., Ltd.)
(Carbon Black)
Seast TA (produced by Tokai Carbon Co., Ltd.)
(Vulcanization Accelerator (1))
Nocceler CZ (produced by Ouchi Shinko Chemical Co., Ltd.)
(Vulcanization Accelerator (2))
Sanceler TT (produced by Sanshin Chemical Industry Co., Ltd.)
(Vulcanizing Agent)
Sulfur (Karuizawa Smelter Co., Ltd.)

Examples 1 to 12

The poly-α-olefin oil and the olefin copolymer used as component (A) and polymers (1) to (6) used as component (B) were blended in the proportions shown in the following Tables 1 and 2 at room temperature in a tank using a double planetary mixer until component (B) was dispersed homogeneously in component (A). While stirring was continued, the temperature in the tank was raised to 120° C. Stirring was carried out at a high speed at 120 to 150° C. for 2 hours or longer. After that, while the system was cooled off to room temperature, defoaming stirring was performed at a low speed to thereby obtain an additive for rubber. The obtained additive for rubber was in a grease form with a consistency of 400 or less (Examples 1 to 4 and Examples 7 to 11) or in a liquid form with dynamic viscosity at 40° C. of 10,000 mm$^2$/s or lower (Examples 5, 6 and 12).

Comparative Examples 1 to 4

As shown in Table 2, a poly-α-olefin oil that is a commercially available lubricant, and a naphthene-based oil, a paraffin-based oil, and an aroma-based oil, which are general rubber process oils, were directly used and evaluated as additives for rubbers.

Example 13

As shown in Table 3, 100 parts of NR, 5 parts of zinc oxide, 1 part of stearic acid, 1.5 parts of an ozone antioxidant, 1 part of an amine antioxidant, 2 parts of wax, 30 parts of carbon black, and 5 parts of the additive for rubber described in Example 1 were kneaded at 140° C. for 5 minutes using a banbury mixer. Next, 1 part of a vulcanizing agent, 2 parts of a vulcanization accelerator (1), and 1 part of a vulcanization accelerator (2) were added therein, followed by 5 minutes of kneading performed at 60° C. using an open roll. As a result, a rubber composition was prepared.

Examples 14 to 24

As shown in Tables 3 and 4, rubber compositions were prepared according to Example 13 with the exception that the additives for rubber described in Examples 2 to 12 were used instead of the additive for rubber described in Example 1.

Examples 25 to 28

As shown in Table 4, rubber compositions were prepared according to Example 15 with the exception that the amount of the additive for rubber described in Example 3 was changed.

Comparative Examples 5 to 9

As shown in Table 5, rubber compositions were prepared according to Example 13 with the exception that the additive for rubbers described in Comparative Examples 1 to 4 were used instead of the additive for rubber described in Example 1.

The properties of the additives for rubber obtained in Examples 1 to 12, Comparative Examples 1 to 4 and the rubber compositions obtained in Examples 13 to 28 and Comparative Examples 5 to 9 were evaluated based on the following criteria.

(Evaporation Loss)

An amount of 10 g of each additive for rubber was added into a petri dish, which was then set in a 120° C. atmosphere for 100 hours. Then, the evaporation loss (%) was determined and is shown in Tables 1 and 2. In this test, the evaporation amount required in the present invention is less than 3.0%. The samples meeting that requirement are indicated by a symbol "0" in the corresponding evaluation sections in Tables 1 and 2, while those failing to meet that requirement are indicated by a symbol "X".

(Heat Aging Test)

Each rubber composition was press molded (vulcanized) at 160° C. for 20 minutes to form a rubber sheet with a thickness of 2 mm. Then, the rubber sheet was used to measure the hardness (HS) according to JIS K 6251. This measurement was performed for the initial rubber sheet (prior to heat aging) and for a rubber sheet that had been thermally aged in a 100° C. atmosphere for 1000 hours. Next, the increase amount ΔHS of the hardness (difference from the initial hardness) caused by heat aging was determined, and the values thereof are shown in Tables 3 to 5. In this test, the increase amount of hardness required in the present invention is less than 10 points. The samples meeting that requirement are indicated by a symbol "O" in the corresponding evaluation sections in Tables 3 to 5, while those failing to meet that requirement are indicated by a symbol "X".

(Spring Properties)

Each rubber composition was press molded (vulcanized) at 160° C. for 20 minutes to form a test piece. The test piece was used to measure the dynamic spring constant and static spring constant according to JIS K 6251. The dynamic magnification was calculated based on these values, and the values thereof are shown in Tables 3 to 5. In this test, the hardness increase degree required in the present invention is 1.30 or less. The samples meeting that requirement are indicated by a symbol "0" in the corresponding evaluation sections in Tables 3 to 5, while those failing to meet that requirement are indicated by a symbol "X".

TABLE 1

|  | Example 1 | Example 2 | Example 3 | Example 4 | Example 5 | Example 6 | Example 7 | Example 8 |
|---|---|---|---|---|---|---|---|---|
| Poly-α-olefin oil | 60 | 75 | 80 | 90 | 95 | 99 | 55 | 85 |
| Olefin copolymer | — | — | — | — | — | — | 25 | — |
| Polymer (1) | 40 | 25 | 20 | 10 | 5 | 1 | 20 | — |
| Polymer (2) | — | — | — | — | — | — | — | 15 |
| Environmental regulation (low PCA) | ○ | ○ | ○ | ○ | ○ | ○ | ○ | ○ |
| Evaporation loss % (120° C. × 100 hrs) | 1.6 ○ | 1.6 ○ | 1.9 ○ | 1.9 ○ | 2.5 ○ | 2.7 ○ | 1.3 ○ | 2.6 ○ |

TABLE 2

|  | Example 9 | Example 10 | Example 11 | Example 12 | Comparative Example 1 | Comparative Example 2 | Comparative Example 3 | Comparative Example 4 |
|---|---|---|---|---|---|---|---|---|
| Poly-α-olefin oil | 80 | 80 | 80 | 98.8 | 100 | — | — | — |
| Olefin copolymer | — | — | — | — | — | — | — | — |
| Polymer (1) | 19 | 19.9 | 19.5 | — | — | — | — | — |
| Polymer (3) | 1 | — | — | — | — | — | — | — |
| Polymer (4) | — | 0.1 | — | — | — | — | — | — |
| –Polymer (5) | — | — | 0.5 | 1.2 | — | — | — | — |
| Naphthene-based oil | — | — | — | — | — | 100 | — | — |
| Paraffin-based oil | — | — | — | — | — | — | 100 | — |
| Aroma-based oil | — | — | — | — | — | — | — | 100 |
| Environmental regulation (low PCA) | ○ | ○ | ○ | ○ | ○ | ○ | ○ | X |
| Evaporation loss % (120° C. × 100 hrs) | 1.7 ○ | 1.7 ○ | 1.7 ○ | 2.7 ○ | 6.9 X | 3.0 X | 12.8 X | 1.1 ○ |

TABLE 3

|  | Example 13 | Example 14 | Example 15 | Example 16 | Example 17 | Example 18 | Example 19 | Example 20 |
|---|---|---|---|---|---|---|---|---|
| NR | 100 | 100 | 100 | 100 | 100 | 100 | 100 | 100 |
| Zinc oxide | 5 | 5 | 5 | 5 | 5 | 5 | 5 | 5 |
| Stearic acid | 1 | 1 | 1 | 1 | 1 | 1 | 1 | 1 |
| Ozone antioxidant | 1.5 | 1.5 | 1.5 | 1.5 | 1.5 | 1.5 | 1.5 | 1.5 |
| Amine antioxidant | 1 | 1 | 1 | 1 | 1 | 1 | 1 | 1 |
| Wax | 2 | 2 | 2 | 2 | 2 | 2 | 2 | 2 |
| Carbon black | 30 | 30 | 30 | 30 | 30 | 30 | 30 | 30 |
| Additive for rubber described in Example 1 | 5 | — | — | — | — | — | — | — |
| Additive for rubber described in Example 2 | — | 5 | — | — | — | — | — | — |
| Additive for rubber described in Example 3 | — | — | 5 | — | — | — | — | — |
| Additive for rubber described in | — | — | — | 5 | — | — | — | — |

TABLE 3-continued

|  | Example 13 | Example 14 | Example 15 | Example 16 | Example 17 | Example 18 | Example 19 | Example 20 |
|---|---|---|---|---|---|---|---|---|
| Additive for rubber described in Example 4 | — | — | — | — | 5 | — | — | — |
| Additive for rubber described in Example 5 | — | — | — | — | — | 5 | — | — |
| Additive for rubber described in Application Example 6 | — | — | — | — | — | — | 5 | — |
| Additive for rubber described in Example 7 | — | — | — | — | — | — | — | 5 |
| Vulcanizing agent | 1 | 1 | 1 | 1 | 1 | 1 | 1 | 1 |
| Vulcanization accelerator (1) | 2 | 2 | 2 | 2 | 2 | 2 | 2 | 2 |
| Vulcanization accelerator (2) | 1 | 1 | 1 | 1 | 1 | 1 | 1 | 1 |
| Heat aging test: ΔHS (less than +10 point) | +5 ○ | +5 ○ | +6 ○ | +6 ○ | +7 ○ | +7 ○ | +4 ○ | +7 ○ |
| Spring property: Dynamic magnification (1.30 or less) | 1.30 ○ | 1.29 ○ | 1.28 ○ | 1.27 ○ | 1.26 ○ | 1.26 ○ | 1.27 ○ | 1.27 ○ |

TABLE 4

|  | Example 21 | Example 22 | Example 23 | Example 24 | Example 25 | Example 26 | Example 27 | Example 28 |
|---|---|---|---|---|---|---|---|---|
| NR | 100 | 100 | 100 | 100 | 100 | 100 | 100 | 100 |
| Zinc oxide | 5 | 5 | 5 | 5 | 5 | 5 | 5 | 5 |
| Stearic acid | 1 | 1 | 1 | 1 | 1 | 1 | 1 | 1 |
| Ozone antioxidant | 1.5 | 1.5 | 1.5 | 1.5 | 1.5 | 1.5 | 1.5 | 1.5 |
| Amine antioxidant | 1 | 1 | 1 | 1 | 1 | 1 | 1 | 1 |
| Wax | 2 | 2 | 2 | 2 | 2 | 2 | 2 | 2 |
| Carbon black | 30 | 30 | 30 | 30 | 30 | 30 | 30 | 30 |
| Additive for rubber described in Example 3 | — | — | — | — | 0.1 | 1 | 10 | 20 |
| Additive for rubber described in Example 9 | 5 | — | — | — | — | — | — | — |
| Additive for rubber described in Example 10 | — | 5 | — | — | — | — | — | — |
| Additive for rubber described in Example 11 | — | — | 5 | — | — | — | — | — |
| Additive for rubber described in Example 12 | — | — | — | 5 | — | — | — | — |
| Vulcanizing agent | 1 | 1 | 1 | 1 | 1 | 1 | 1 | 1 |

TABLE 4-continued

|  | Example 21 | Example 22 | Example 23 | Example 24 | Example 25 | Example 26 | Example 27 | Example 28 |
|---|---|---|---|---|---|---|---|---|
| Vulcanization accelerator (1) | 2 | 2 | 2 | 2 | 2 | 2 | 2 | 2 |
| Vulcanization accelerator (2) | 1 | 1 | 1 | 1 | 1 | 1 | 1 | 1 |
| Heat aging test: ΔHS (less than +10 point) | +5 ○ | +5 ○ | +5 ○ | +7 ○ | +3 ○ | +3 ○ | +7 ○ | +9 ○ |
| Spring property: Dynamic magnification (1.30 or less) | 1.26 ○ | 1.28 ○ | 1.25 ○ | 1.25 ○ | 1.28 ○ | 1.25 ○ | 1.28 ○ | 1.30 ○ |

TABLE 5

|  | Comparative Example 5 | Comparative Example 6 | Comparative Example 7 | Comparative Example 8 | Comparative Example 9 |
|---|---|---|---|---|---|
| NR | 100 | 100 | 100 | 100 | 100 |
| Zinc oxide | 5 | 5 | 5 | 5 | 5 |
| Stearic acid | 1 | 1 | 1 | 1 | 1 |
| Ozone antioxidant | 1.5 | 1.5 | 1.5 | 1.5 | 1.5 |
| Amine antioxidant | 1 | 1 | 1 | 1 | 1 |
| Wax | 2 | 2 | 2 | 2 | 2 |
| Carbon black | 30 | 30 | 30 | 30 | 30 |
| Poly-α-olefin oil | 5 | — | — | — | 4 |
| Naphthene-based oil | — | 5 | — | — | — |
| Paraffin-based oil | — | — | 5 | — | — |
| Aroma-based oil | — | — | — | 5 | — |
| Polymer (1) | — | — | — | — | 1 |
| Vulcanizing agent | 1 | 1 | 1 | 1 | 1 |
| Vulcanization accelerator (1) | 2 | 2 | 2 | 2 | 2 |
| Vulcanization accelerator (2) | 1 | 1 | 1 | 1 | 1 |
| Heat aging test: ΔHS (less than +10 point) | +9 ○ | +10 x | +18 x | +7 ○ | +9 ○ |
| Spring property: Dynamic magnification (1.30 or less) | 1.32 x | 1.31 x | 1.29 ○ | 1.45 x | 1.32 x |

As can be seen from the results shown in Tables 1 and 2, the additive for rubbers obtained in Examples 1 to 12 are not subject to environmental regulation (low PCA) and have low evaporation loss. Also, as can be seen from the results shown in Tables 3 and 4, the rubber compositions obtained in Examples 13 to 28 by blending the additives for rubber obtained in Examples 1 to 12 exhibit excellent heat resistance and spring properties.

On the other hand, although the additives for rubber obtained in Comparative Examples 1 to 4 are not subject to environmental regulation (low PCA), the evaporation loss is relatively high compared to the additives for rubber obtained in Examples 1 to 12 and does not meet the requirement of the present invention. Although the additive for rubber obtained in Comparative Example 4 has much lower evaporation loss, it is subject to environmental regulation since it contains a high content of PCA. Also, as can be seen from the results shown in Table 5, the rubber composition obtained in Comparative Example 5 prepared by blending the additive for rubber obtained in Comparative Example 1, and the rubber composition obtained in Comparative Example 8 prepared by blending the additive for rubber obtained in Comparative Example 4 cannot meet the requirement for the spring property of the present invention. The rubber composition obtained in Comparative Example 6 prepared by blending the additive for rubber obtained in Comparative Example 2 cannot meet the requirements for heat resistance and the spring property of the present invention. The rubber composition obtained in Comparative Example 7 prepared by blending the additive for rubber obtained in Comparative Example 3 cannot meet the requirement for heat resistance of the present invention. The rubber composition obtained in Comparative Example 9 prepared by blending components (A) and (B) separately cannot meet the requirement for the spring property of the present invention.

INDUSTRIAL APPLICABILITY

The additive for rubber of the present invention is not subject to environmental regulation and can provide a rubber composition with excellent heat resistance and spring property.

Moreover, the rubber composition of the present invention is prepared by blending the aforementioned additive for rubber and has excellent heat resistance and spring property. The rubber composition can be suitably used as a rubber composition for vibration isolation. Specifically, it can be suitably used as a vibration damping material for an engine mount, a stabilizer bushing, and a suspension bushing in automobiles or other vehicles, in addition, the rubber composition may also be used for a control damper of a computer hard disk, a vibration damper for a washing machine or other household appliance, an architectural anti-seismic wall in the construction and housing field, a vibration control (vibration suppression) damper or other vibration control (vibration suppression) apparatus and seismic isolation apparatuses, as well as for automobile tires, footwear, hoses, belts, air springs, anti-slip sheets, and other general and industrial products.

What is claimed:

1. A rubber part for vibration damping obtained by crosslinking and molding a rubber composition comprising (D) a reinforcing agent of carbon black, obtained by blending an additive for rubber with a rubber (C), the additive comprising (A) a poly-α-olefin oil and (B) a styrene-diene block copolymer, wherein the poly-α-olefin oil is hydrogenated homopolymer or copolymer using one or more monomers selected from the group of 1-hexene, 1-octene, 1-decene, 1-dodecene, and 1-tetradecene as raw materials, wherein the component (B) comprises styrene-hydrogenated polyisoprene and/or styrene-hydrogenated poly(isoprene/butadiene), wherein all or part of the component (B) has a diblock structure.

2. The rubber part according to claim 1, wherein the composition comprises the component (A) in an amount of 60 to 99 mass % and the component (B) in an amount of 1 to 40 mass % with respect to the total mass of the additive for rubber.

3. The rubber part according to claim 1, wherein the component (C) comprises a natural rubber and/or a diene-based synthetic rubber.

4. The rubber part according to claim 1, wherein the additive for rubber is blended in an amount of 0.1 to 20 parts by mass with respect to 100 parts by mass of the component (C).

5. A rubber part for vibration damping obtained by crosslinking and molding a rubber composition comprising (D) a reinforcing agent of carbon black, obtained by blending an additive for rubber with a rubber (C), the additive comprising (A) a poly-α-olefin oil and an olefin copolymer and (B) a styrene-diene block copolymer, wherein the poly-α-olefin oil is hydrogenated homopolymer or copolymer using one or more monomers selected from the group of 1-hexene, 1-octene, 1-decene, 1-dodecene, and 1-tetradecene as raw materials, wherein the component (B) comprises styrene-hydrogenated polyisoprene and/or styrene-hydrogenated poly(isoprene/butadiene), wherein all or part of the component (B) has a diblock structure.

6. The rubber part according to claim 5, wherein the composition comprises the component (A) in an amount of 60 to 99 mass % and the component (B) in an amount of 1 to 40 mass % with respect to the total mass of the additive for rubber.

7. The rubber part according to claim 5, wherein the component (C) comprises a natural rubber and/or a diene-based synthetic rubber.

8. The rubber part according to claim 5, wherein the additive for rubber is blended in an amount of 0.1 to 20 parts by mass with respect to 100 parts by mass of the component (C).

* * * * *